Aug. 6, 1929.  R. M. HAERTTER  1,723,507
PANCAKE TURNER TYPE KITCHEN UTENSIL
Filed July 10, 1928
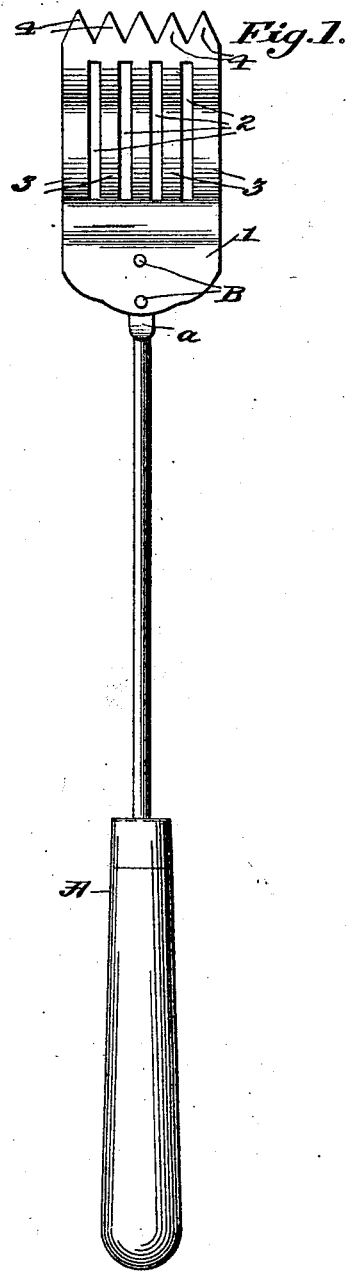
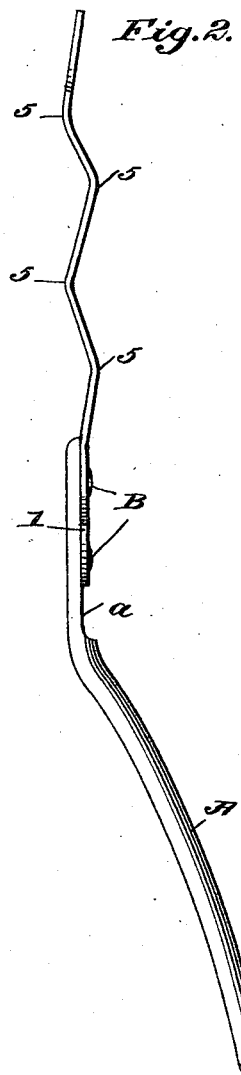
Inventor:
Reba M. Haertter,
by Richard E. Babcock
Att'y.

Patented Aug. 6, 1929.

1,723,507

UNITED STATES PATENT OFFICE.

REBA M. HAERTTER, OF IRVINGTON, NEW JERSEY.

PANCAKE-TURNER-TYPE KITCHEN UTENSIL.

Application filed July 10, 1928. Serial No. 291,631.

This invention relates to a kitchen utensil of the pancake turner type for lifting, draining and turning such articles as bacon, fritters and other relatively small frying edibles, etc., and for deep fat frying, but is primarily intended for use in turning and for lifting or removing sliced bacon from the frying pan and draining it incident to such removal, said utensil being a quick, practically instantaneous drainer where hot grease or other freely flowing liquids are involved.

The objects of the present invention are to provide a corrugated longitudinally perforated, preferably longitudinally slotted, lifter or turner blade, the corrugations serving to maintain the slice of bacon or other article and the lifter out of contact except at the ridges of the corrugations, thus facilitating the almost instantaneous drainage of the hot grease or other freely flowing liquid from the bacon or other article; to provide in such a utensil a serrated front edge portion avoiding the scooping up of excessive grease; to provide an efficient cheap sheet metal turner or lifter of this type having a plurality of relatively wide slots extending from adjacent the serrated edge portion for the greater portion of the lifter blade to extend over the portion thereof actually supporting the articles being turned or lifted; to provide for corrugating the blade transversely and having its serrated edge end portion extend across the forward ends of the slots, so bracing and stiffening the blade as a whole; and to provide in such a type utensil a stamped and formed blade of thin sheet metal capable of production on a large quantity basis on a small sheet metal stamping press.

In this application I show and describe only the present preferred form of my invention, simply by way of illustration of the practice of my invention as by law required. However, I recognize that my invention is capable of other and different embodiments, and that the various details thereof may be modified in various ways, all without departing from my said invention; therefore, the drawing and description herein are to be considered as merely illustrative and not as exclusive.

In the accompanying drawing:

Figure 1 represents a top plan view of a lifter or turner embodying my invention; and Figure 2, an edge elevation thereof, with the handle broken away, and on an enlarged scale.

Referring now in detail to the drawings, A designates the usual composite long handle of rod form for the majority of its length, having a wooden hand-grip mounted on its upper portion, and having its lower end portion offset and flattened as at $a$, and B designates two rivets which may be integral with said portion $a$ and pass through perforations in the blade 1 and be upset or riveted over as usual, thus serving to hold the blade 1 rigidly to the handle A.

The blade 1 is of resilient stiff light weight or thin gage sheet metal and formed with a plurality of perforations, preferably long, preferably relatively wide, preferably substantially longitudinally extending, slots 2, between bars 3, which may be of greater width than said slots. Also said blade 1 has a deeply serrated front or operative edge, the serrations forming teeth or points 4, and is so formed as a whole, preferably by a plurality of transverse corrugations 5, that an article resting on the blade 1 will be supported at widely separated portions thereof by point or line contact out of contact with the greater portion of the upper portion of said blade 1, whereby the grease or liquid picked up with the slice of bacon or other article will drain off very quickly, practically instantaneously, there being nothing to clog drainage to or through the slots 2.

The two end portions of the blade 1 serve to connect the ends of the bars 3, and all portions of the blade will preferably be integral as shown, this being by far the most economical and practical method of manufacture, however, it is not essential that all parts of the blade 1 shall be stamped or otherwise formed integrally from a single piece of material.

In the embodiment illustrated I have shown four slots 2, five bars 3 and five points or teeth 4, the points or teeth 4 being triangular in shape and relatively large, separated from each other by relatively large, deep serrations, and the slots 2 extending over that portion of the plate 1 actually supporting, in use, the article being turned or lifted, and said slots 2 as shown extend in a longitudinal straight line parallel with the side edges of the blade 1, and are of a width approximately two-thirds that of the three central bars 3 and approximately one half that of the two side bars 3. The shape of said points 4 with the intervening serrations, and of said slots 2 are unimportant, as is also their number. It is desirable that the metal of plate 1 shall be cut out by slots 2 to as great an extent as is practicable without carrying it to such an extent as will impair the rigidity of the plate 1 to an impractical degree. If a thicker sheet stock be used, the width of the slots 2 with relation to the bars 3 may be increased, or the number of slots 2 for a given width of blade 1 may be increased, or both the number of slots and width of the individual slots may be increased, or, as stated, perforations of other than slot form may be employed.

In the embodiment illustrated the blade 1 has a plurality of corrugations, but it is of no importance whether it have the exact number of corrugations shown, or more, nor is it of vital importance that it shall have corrugations at all so long as the blade 1 has an irregular upper surface having portions raised with relation to other portions and serving to support articles out of contact with the other portions of said blade. However, such transverse corrugations 5 act to brace the blade 1 as a whole, and the corrugations 5 extending transversely at approximately right angles to the longitudinally extending slots 2 avoids possible clogging of the slots 2 and results in a very highly efficient quick draining utensil.

Having thus described my invention, what I claim as new and desire to secure by Letters Patent is:

1. A pancake-turner type kitchen utensil comprising a thin sheet-form blade formed with a serrated forward edge and with a plurality of longitudinally extending bars and slots, the bars and slots alternating and extending substantially parallel to the side edges of the blade and for the major portion of the length thereof, said bars having their adjacent end portions integrally connected with each other by portions respectively of said blade extending transversely thereof, said blade as a whole being formed with a plurality of relatively deep corrugations extending approximately at right angles to the side edges thereof and to said slots and bars and through the same.

2. A pancake-turner type kitchen utensil comprising a thin blade formed with a plurality of longitudinally extending bars and slots, the bars and slots alternating and extending substantially parallel to the side edges of the blade and for the major portion thereof, said blade being formed with a plurality of relatively deep corrugations extending approximately at right angles to the side edges thereof across said bars and slots.

3. A pancake-turner type kitchen utensil comprising a thin blade formed with a plurality of longitudinally extending slots extending for the major portion thereof substantially parallel to the side edges thereof, the said blade being formed with a plurality of relatively deep corrugations extending in a transverse direction across said slotted portion.

4. A pancake-turner type kitchen utensil comprising a thin blade having a plurality of openings, said blade having an irregular upper surface having portions raised with relation to other portions thereof and serving to support articles out of contact with said other portions whereby the drainage through said openings will not be substantially interfered with.

5. A pancake-turner type kitchen utensil comprising a lifting portion having a plurality of openings, said portion having an undulating supporting surface having portions raised with relation to other portions thereof and serving to support articles substantially out of contact with said other portions of said lifting portion.

In testimony whereof, I have signed my name to this specification at Irvington, New Jersey, this 6th day of July, 1928.

REBA M. HAERTTER.